Sept. 30, 1958　　　E. B. McMILLAN ET AL　　　2,854,668
DIELECTRIC WALLS FOR TRANSMISSION
OF CENTIMETRIC RADIATION
Original Filed May 3, 1952　　　　　　　3 Sheets-Sheet 1

INVENTORS
Raymond M. Redheffer
Edward B. McMillan

INVENTORS
Raymond M. Redheffer
Edward B. McMillan

Sept. 30, 1958 E. B. McMILLAN ET AL 2,854,668
DIELECTRIC WALLS FOR TRANSMISSION
OF CENTIMETRIC RADIATION
Original Filed May 3, 1952 3 Sheets-Sheet 3

INVENTORS
Raymond M Redheffer
Edward B. McMillan

United States Patent Office 2,854,668
Patented Sept. 30, 1958

2,854,668

DIELECTRIC WALLS FOR TRANSMISSION OF CENTIMETRIC RADIATION

Edward B. McMillan, Ipswich, Mass., and Raymond M. Redheffer, West Los Angeles, Calif.

Substituted for abandoned application Serial No. 285,944, May 3, 1952. This application August 3, 1953, Serial No. 372,108

8 Claims. (Cl. 343—872)

This invention relates to dielectric walls for transmission of microwave or centimetric radiation and in particular to walls for airborne radomes.

Microwave radar is placed within the radome nose of guided missiles, from whence it emits a beam which searches for, locates, and follows a target until it overtakes it. Accuracy of angular direction of the axis of the beam is particularly important at rocket speeds. Similarly, in the installation of gun laying radar it is important that any deviation of the beam from the boresight axis be negligible.

In practice it has been found that as the beam scans and is transmitted through radome noses of ogival, conical, or other severely streamlined shapes, it encompasses different areas of the radome which may be of such a wall thickness and so unsymmetrically disposed with respect to the beam that phase retardation, phase distortion, and resulting shift in beam direction occur. The result is usually a focussing effect in the direction of least dissymmetry, as though it has been produced by a convex lens.

In the joint application of ourselves and Herbert Leaderman, Serial Number 108,328 of August 3, 1949, now United States Patent No. 2,659,884, issued November 17, 1953, we disclosed an improvement in dielectric walls for the transmission of centimetric radiation, comprising a dielectric wall for transmission of electromagnetic waves, said wall comprising a dielectric sheet wherein the dielectric constant increases from the faces to the interior. One specific instance of such a wall which we disclosed therein was a wall for transmission of electromagnetic waves comprising an inner dielectric layer and outer dielectric layers, the dielectric constant of said outer layers being smaller than the dielectric constant of said inner layers, the thickness of $d$ of said outer layers for transmission at an angle of incidence $\theta$ at a wavelength $\lambda$ being given by the following equation, $$d = \frac{(2n+1)\lambda_0}{4(\alpha-p)^{1/2}}$$

where $p = \sin^2\theta$, $n$ is zero or a positive integer, $\lambda$ is the wavelength of the waves in the surrounding medium and $\alpha$ is the relative dielectric constant of the outer layers, whereby to cause wave interference. It is a purpose of the present invention to provide a wave propagation system wherein the wave source is related to the surface of the dielectric wall to provide an angle of incidence $\theta$ such that the dielectric wall will have the minimum average reflection over the widest range of angles of incidence for any given inner layer thickness.

It is a further purpose of the present invention that there shall be a central core layer having the properties of a phase retarder for the phase front of electromagnetic wave radiation, whereby the shape of the phase front may be controlled. An additional purpose of the present invention is that said core may be employed as a correcting concave lens disposed in increasing thickness away from the center of the area of least dissymmetry of a dielectric wall, which without such a core would behave as a convex lens, producing a phase shift in the transmitted wave front and a resulting shift in direction of said front. Another purpose of the present invention is to provide a dielectric wall for the transmission of electromagnetic wave radiation in which the thickness of the core layer is adjusted so as to keep the reflection extremely low at grazing angles of incidence above 70 degrees.

A still further purpose of the present invention is to provide a dielectric wall for the transmission of electromagnetic wave radiation in which the core thickness may be adjusted to correct for changes in the phase front caused by dielectric masses in proximity to said wall. Still another purpose of the present invention is to provide an ogival or cone shaped radome having a blunt tip end, covered on the outside by a parallel plate lens in the form of a streamlined nose cap. Still an additional purpose of the present invention is to provide a means of adjusting the dielectric constant of the core or outer layers of the dielectric wall to the values required by the design equations by the addition and distribution of conductive particles in said layers.

Reference is made to the drawings forming a part of the present disclosure, in which.

Figure 3:
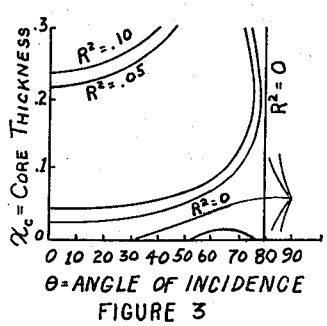

Figure 3 is a graph of power reflection as a function of inner layer thickness and angle of incidence as used in radome design according to the invention of U. S. Patent Number 2,659,884.

Figure 4:
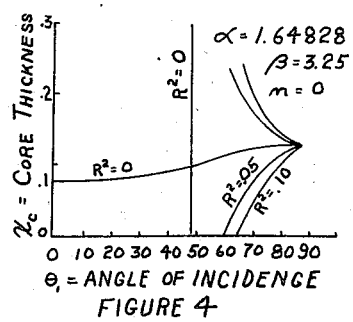

Figure 4 is a graph of power reflection as a function of inner layer thickness and angle of incidence as used in radome design according to the present invention.

Figure 5:
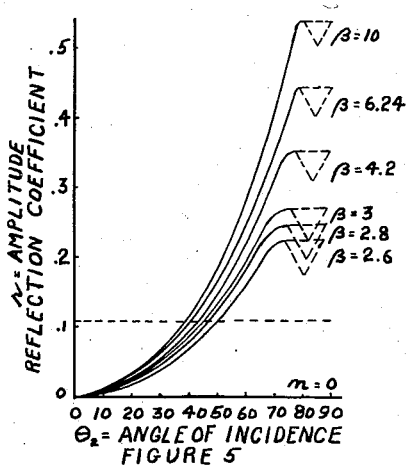

Figure 5 is a graph of half-sandwich reflection as a function of angle of incidence for a dielectric wall for the determination of optimum design angle according to the present invention.

Figure 6:
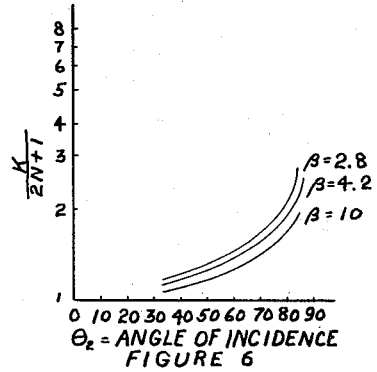

Figure 6 is an auxiliary computation curve for the determination of optimum design angle.

Figure 7:
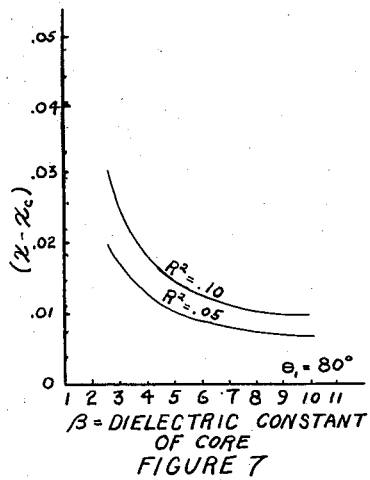

Figure 7 is a graph of dimensional tolerance of inner layer thickness as a function of inner layer dielectric constant for dielectric walls according to the present invention.

Figure 8:
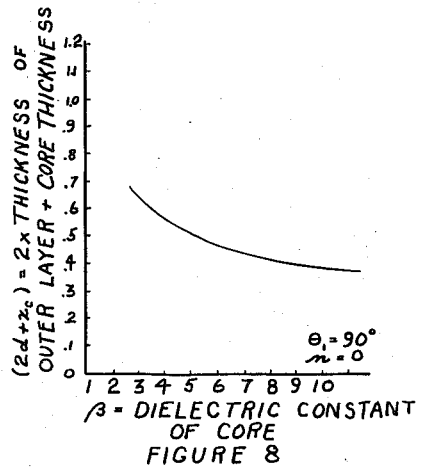

Figure 8 is a graph of over-all thickness as a function of inner layer dielectric constant for dielectric walls according to the present invention.

Figure 9:
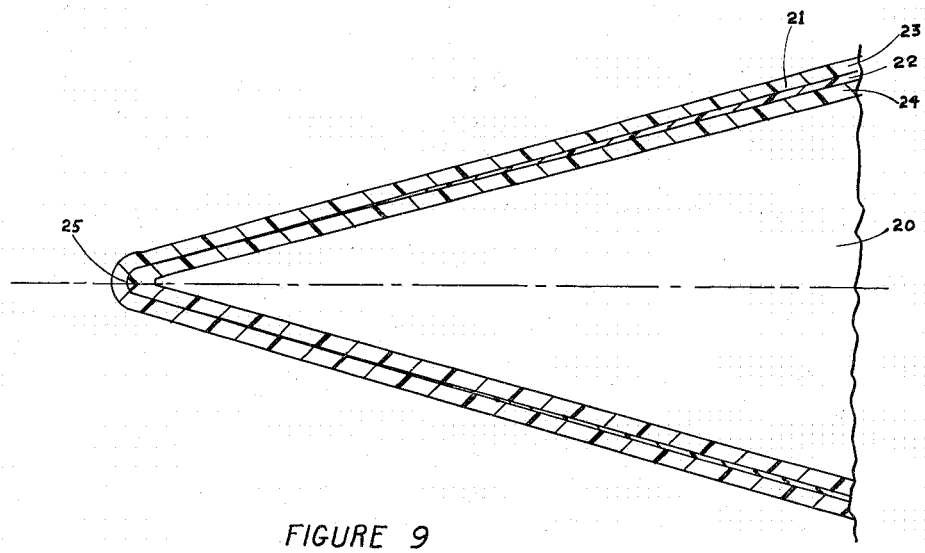

Figure 9 is a longitudinal cross-sectional view of a guided missile conical radome nose, according to the invention.

Figure 10:
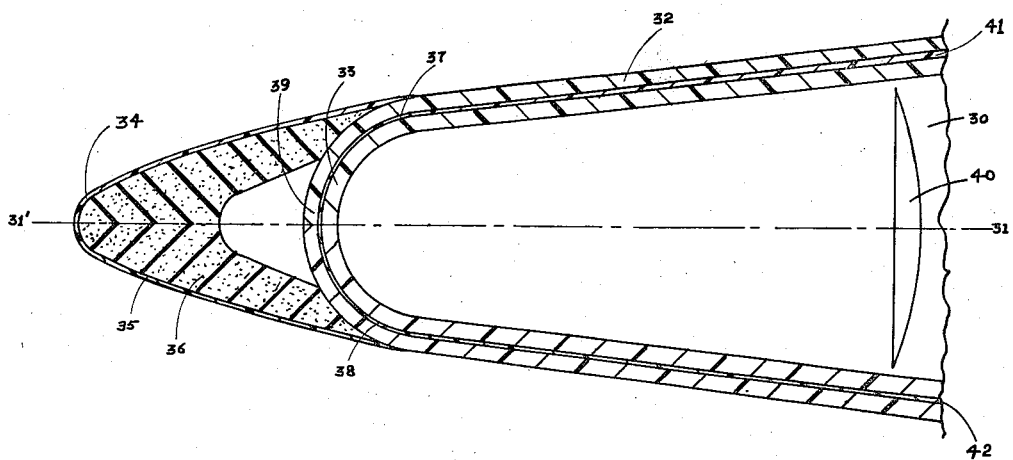

Figure 10 is a longitudinal cross-sectional view of a guided missile conical radome nose having a lens nose cap, according to the invention.

Figure 1:
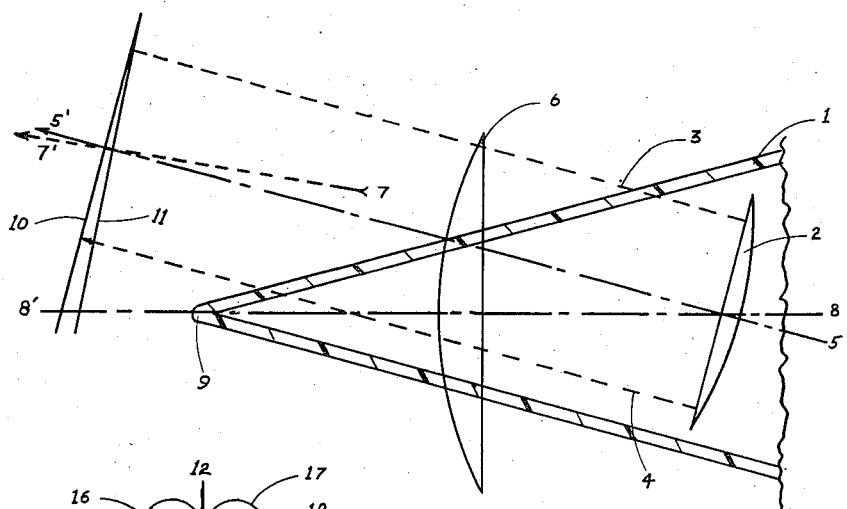
Figure 1 is a longitudinal cross-sectional view of a guided missile radome nose.

In Figure 1 is shown a conical nose radome 1 for a rocket propelled guided missile. At the base end of the radome is installed a conical scanning radar antenna 2 radiating and conically scanning a cylindrical beam 3 and 4 about a boresight axis 5—5′. When there is no error in the location of the cross-over axis of the antenna pattern, it coincides with axis 5—5′. However, a conical or ogival radome can act as though it were a convex lens such as that shown at 6, in which case the cross-over axis shifts as at 7—7′, producing an angular error toward the direction of the longitudinal axis 8—8′ through the apex 9 of the radome, where the least dissymmetry is found. The optical theory explaining the lens effect is not as yet completely understood; however, the phase front 10 which the radiation should have is shifted to the position as for 11, unless a corrective structure having the properties of a concave lens is designed into the radome.

Figure 2:
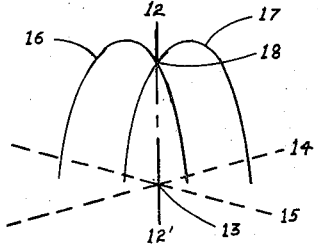
Figure 2 is a longitudinal cross-sectional view of a conically scanned radar beam.

Figure 2 explains the boresighting of the cross-over axis 12—12' further. In conical scanning the plane of the aperture of the antenna 2 swings about axis 12—12' near a point such as 13 in opposite extreme positions such as 14 and 15. A cross-section of the antenna pattern in the plane of the page discloses two positions of the main lobe 16 and 17. The cross-over point 18 and the cross-over axis 12—12' must coincide with boresight axis 5—5' of Figure 1 if there is to be no boresighting error in the radar guidance system of the missile.

It was disclosed in our Patent 2,659,884 that at one angle of incidence the dielectric wall of that invention will have zero reflection regardless of the inner layer thickness. It is seen in Figure 3 that at other angles of incidence $\theta_1 = 0° - 90°$ there is only one inner layer thickness $x$, for a first order sandwich ($n=0$), for which the power reflection $R^2$ is zero, and that for intermediate thicknesses as the thickness departs from the optimum the reflection increases. There are, however, three useful design parameters for use with an inner layer of given dielectric constant, namely, the outer layer dielectric constant, the outer layer thickness, and the inner layer thickness. It is an object of the present invention to provide a wave propagation system wherein these variables are selected so as to reduce the maximum reflection encountered at any inner layer thickness at angles of incidence other than the single angle for which no reflection is found at any thickness.

Our procedure takes advantage of the fact disclosed in our Patent 2,659,884 that the reflection due to the outer layer alone may be made zero at any prescribed angle of incidence by properly choosing at a given wavelength $\lambda$ the outer layer dielectric constant $\alpha$ and outer layer thickness $d$ to correspond to a given inner layer dielectric constant $\beta$ according to the following equations:

(1) $d\sqrt{\beta - \sin^2 \theta} = (2n+1)^{2/4}$   ($n = 0, 1, 2, \ldots$)

(2) $(\alpha \sec^2 \theta - \tan^2 \theta)^2 = \beta \sec^2 \theta - \tan^2 \theta$ In the present invention we provide a wall wherein the ratio between parameters $\alpha$, the outer layer dielectric constant, and $\beta$, the inner core layer dielectric constant, and $d$, said outer layer thickness, keep the reflection $R$ from the dielectric wall as a whole below a fixed value at all angles of incidence below the angle $\theta_2$ (also called the design angle of incidence), for which this ratio gives zero reflection. The walls according to the present invention provide a solution for the special field of radar housings for rockets, jet planes, and missiles where it is required that the power reflection be 10% or less at angles of incidence above 70 degrees.

On referring to Figure 4, which is a graph employing rectangular coordinates of reflection contours, the coordinates being of inner layer thickness versus angle of incidence, we have discovered that the angle $\theta_1$, at which the contours will first appear as we increase the design angle $\theta_2$, will in general be the angle farthest from the design angle $\theta_2$ optimum, hence it will be $\theta_1 = 0$. We define the optimum design angle $\theta_2$ opt. as being the angle at which the reflection contour for the maximum tolerable reflection first appears at the angle $\theta_1 = 0$. Then from $\theta_1 = 0$ to $\theta_1 = \theta_2$ opt. there is no reflection contour for a value as great as the maximum tolerable reflection. In our procedure we determine the design outer layer dielectric constant $\alpha$ and thickness $d$ by using the value of $\theta_2$ opt. for $\theta$ in Equations 1 and 2.

In the present invention to determine $\theta_2$ opt. an auxiliary curve such as that shown in Figure 5 is prepared of the half-sandwich reflection $\gamma$ at normal incidence for a sandwich wall designed to give zero reflection at angle of incidence $\theta_2$ for the assumed inner layer dielectric constant. To prepare the curve we compute the skin dielectric constant $\alpha$ and the skin thickness $d$ for each of a series of values of $\theta_2$ from 0° to 90°. The computing method is as follows:

where
$$P_2 = \sin^2 \theta^2$$
$$\alpha = [\cos \theta_2 \sqrt{B - P + P_2}] \quad \text{Eq. (3)}$$
$$d = \frac{2n+1}{4\sqrt{\alpha - p^2}} \quad (n = 0, 1, 2, \ldots) \quad \text{Eq. (4)}$$

The normal incidence half sandwich reflection is determined by
$$\gamma = \left[\frac{A-B}{A+B}\right]^{1/2} \quad \text{Eq. (5)}$$

where
$$A = (\alpha + \beta)(\alpha + 1) - (\alpha - \beta)(\alpha - 1) \cos \epsilon$$
$$B = 4\alpha\sqrt{\beta}$$
$$\epsilon = \frac{4\pi d \sqrt{\alpha}}{\lambda}$$

The curve of $\gamma$ vs. $\theta_2$ proceeds through a series of maxima and minima for large values of $\theta_2$ becoming infinite in the frequency of its amplitude change.

The angular location of the maxima and minima is obtained from the following equation:
$$\sqrt{1 + \frac{p}{\sqrt{(1-p)(\beta-p)}}} = \frac{K}{2n+1} \quad \text{Eq. (6)}$$

for even integers K locates the maxima and for odd integers the minimum K must be equal to or greater than $2n+1$. In Figure 6, $\theta_2$ is plotted against $$\frac{K}{2n+1}$$

The values of $\gamma$ maximum and $\gamma$ minimum are found from:
$$\frac{\gamma_1 + \gamma_2}{1 \pm \gamma_1 \gamma_2} = \gamma \text{ max., min.} \quad \text{Eq. (7)}$$

where
$$\gamma_1 = \frac{\sqrt{\alpha - 1}}{\sqrt{\alpha + 1}}$$

and
$$\gamma_2 = \frac{\sqrt{\beta} - \sqrt{\alpha_{\theta_2}}}{\sqrt{\beta} + \sqrt{\alpha_{\theta_2}}}$$

$\gamma$ max. proves to be a constant, and it develops that $\gamma$ max. $= \gamma$ min. at $\theta_2 = 90°$.

Finally to locate the optimum design angle, we draw the horizontal line
$$\frac{2\gamma}{1+\gamma^2} = R$$

Figure 5, where R equals the square root of the maximum power reflection that is to be allowed at angles of incidence less than that equal to the optimum design angle. The intersection of this line with the curve of $\gamma$ vs. $\theta_2$ gives the optimum value of the design angle and will for reasonable values of $\gamma$ be a single point.

The outer layer dielectric constant and thickness determined by substituting $\theta_2$ opt. for $\theta$ in Equations 1 and 2 is used for the design of the optimum dielectric wall; the procedure for completing the design of the dielectric wall according to our invention is from that point on identical with the procedure of our Patent 2,659,884. Employing the parameters $\theta$ opt., $\alpha$, and $d$ determined according to the present invention a graph as in Figure 2 is prepared of power reflection as a function of inner layer thickness $x$ and the actual angle of incidence $\theta_1$, wherein the optimum core thickness $x_c$ is given by:

$$\frac{x_c \sqrt{\beta - p}}{\lambda} = \frac{n}{2} - \frac{1}{2\pi} \tan^{-1} \left[\frac{2\sqrt{(\alpha-p)(\beta-p)}(\alpha-1) \sin \epsilon}{(\alpha+1-2p)(\beta-\alpha)+(\alpha-1)(\beta+\alpha-2p) \cos \epsilon}\right]$$

where $$\epsilon = \frac{4\pi d\sqrt{\alpha - p}}{\lambda}$$

corresponding to Equation 4 of the above referred to patent of ourselves and Herbert Leaderman.

This graph is used to choose a value of the inner layer thickness $x$, the only parameter remaining to be determined for the electrical design of our dielectric wall. Since the graph allows the reflection performance of any dielectric wall according to our invention to be seen immediately, a value of inner layer thickness may be chosen readily with regard to reflection as well as to the mechanical requirements of the wall.

We prepared a series of such graphs, varying the inner layer dielectric constant $\beta$ from 12.7 to 2.55 and discovered that the power reflection $R^2=0$ contour for a range of angles of incidence $\theta$ from 0 to 90° was substantially flat for values of $\beta$ down to approximately 5.5, at which point the contour began to tilt up more rapidly at the $\theta=90°$ end for each decrease in $\beta$. It was observed that for values of $\beta$ over 5.5 a dielectric wall having value of inner layer thickness $x$ chosen to fall on the $R^2=0$ contour for any value of $\theta$ would be the closest to this contour and hence would yield the least reflection of electromagnetic radiation at other angles of incidence $\theta$.

We plotted a graph of dimensional tolerance of inner layer thickness as a function of inner layer dielectric constant, as in Figure 7. As a measure of dimensional tolerance we chose the plus and minus deviation in inner layer thickness that would produce a power reflection of 0.05 at an angle of incidence of 80°. We found that between values of $\beta$ from about 5.5 to 12.7 the decrease in tolerance was slow.

We plotted a graph of over-all thickness of the dielectric wall as a function of inner layer dielectric constant as in Figure 8 and found that for values of $\beta$ from about 5.5 to 12.7 the overall thickness changes at a slow rate so that errors in manufacture would have a minimum harmful effect in causing reflection and that the overall thickness in this range was substantially less than for lower inner layer dielectric constants.

We examined the outer layer dielectric constants to correspond for proper design to inner layer dielectric constants in the range of about 5.5 to 12.7 and found them to lie in the range of about 2.09 to 3.13. For these we found low loss dielectric materials ranging from Teflon (polytetrafluoroethylene) to about 2.08 to full density compounds of synthetic rubber loaded with magnesium oxide at the 3.13 end of the range. We discovered that we could transfer mold radomes very rapidly, an operation that is impractical in the manufacture of conventional radomes of the structure sandwich type where the inner layer is a cellular material. It has hitherto been impossible to manufacture radomes, especially for microwave radar, except by relatively slow, cumbersome processes.

We also found that we could make conventional structural sandwiches for dielectric walls according to our invention, employing a cellular material for the inner layer.

In Figure 9 is disclosed a guided missile radome nose 20 of conical shape, designed according to the invention. The dielectric wall 21 comprises a core layer 22 and outer layers 23 and 24 of lower dielectric constant than said core layer. At the apex 25 of the radome, the area of the least dissymmetry, the optimum core thickness for zero reflection in the range of 70 to 85 degrees of incidence is used. The thickness of the core is gradually increased toward the base of the cone at a rate experimentally determined so as effectively to produce a structure in the core exhibiting the properties of a concave diverging lens of equal and opposite effect to the concave focussing lens properties of a similar radome without a varying core thickness. The optimum core thickness $x_c$ at apex 25 is substantially determined by the equation:

$$\frac{x_c\sqrt{\beta - p}}{\lambda} = \left\{\frac{n}{2} - \frac{1}{2\pi}\tan^{-1}\left[\frac{2\sqrt{(\alpha - p)(\beta - p)}(\alpha - 1)\sin\epsilon}{(\alpha + 1 - p)(\beta - \alpha) + (\alpha - 1)(\beta + \alpha - 2p)\cos\epsilon}\right]\right\} \quad \text{Eq. (8)}$$

where
$x_c$ = the optimum core thickness
$\beta$ = the core dielectric constant
$\lambda$ = the wavelength of the radiation in free space
$n$ = zero or a whole number
$\alpha$ = the outer layer dielectric constant
$$\epsilon = \frac{4\pi d\sqrt{\alpha - p}}{\lambda}$$
$d$ = the outer layer thickness
$p = \sin^2\theta$
$\theta_1$ = the actual angle of incidence at the point of incidence To determine $\alpha$, $\beta$, and $d$, the optimum design angle of incidence is employed. In the general case, where there are more than two outer layer of differing dielectric constant, when the thickness of any outer $k$ is $d_k$.

$$d_K = \frac{\lambda}{4\sqrt{\epsilon_K - p}} \quad \text{Eq. (9)}$$

where
$\lambda$ = the wavelength of the radiation
$\epsilon_k$ = the dielectric constant of said layer
$p = \sin^2\theta_k$ where $\theta_k$ is the angle of incidence.

In Figure 10 is disclosed a cross-section of a guided missile radome nose 30, disposed symmetrically about longitudinal axis 31—31', comprising a truncated cone 32 terminating in a spherical section 33 of several wave lengths in radius and streamlined on the outside by phase retarding lens construction 34, in which said lens nose cap comprises a streamlined block 36 of plastic or rubber or a foam of either material, covered by a thin plastic or rubber layer 35. The thickness of the core layer at points 37 and 38 is determined by Equation 8 for the highest angle of incidence at that portion of the dielectric wall. The electrical thickness is then decreased toward point 39 on the longitudinal axis 31—31' in proportion to the varying electrical thickness of said lens construction 34, in such a manner that the varying electrical path length of the entire wall of the radome transmits an undistorted phase front of the radiation from antenna 40. Lenses may be placed inside the radome in the apex, along or together with a nose cap lens. Also, the spherical section 33 of the dielectric wall can be omitted and replaced by a lens designed so as to have the electrical path length of said wall section.

From point 37 to point 41 and from point 38 to point 42 the core thickness increases to produce a concave diverging lens to equal and balance out the convex focussing lens effect of the substantially conical shape, said effect having been experimentally measured.

Nose caps can be used employing other lens constructions. For example, alternate laminations of magnetic and dielectric materials disposed and proportioned so as to maintain a one to one ratio of effective magnetic permeability and effective dielectric constant, whereby the nose cap will have the characteristic impedance of free space and there will be substantially no distortion of the phase front of the radiation caused by said nose cap, or the impedance may be increased or decreased to produce any desired phase retardation.

An alternative construction for the nose cap, producing substantially equivalent results, is the metal-plate lens structure, described in Chapter 11 of "Microwave Antenna Theory and Design" edited by Samuel Silver and published by the McGraw-Hill Book Company, Inc. of New York (first edition, 1949). In some conical scan antenna patterns the polarization rotates, while in others it remains substantially fixed. For the first case a honeycomb metal plate lens would be designed and for the second case a parallel metal-plate lens structure. The effective dielectric constant of such a structure can be 1.0 if the metal surfaces are separated by dielectric material, and if those metal surfaces normal to the electrical vector of the radiated wave are separated at such a distance that the dielectric constant of the lens without the dielectric material is the reciprocal of the dielectric constant of the material. The metal surfaces may comprise metal wires or metal sheets.

By varying the spacing of the metal surfaces the dielectric constant along the path of the radiation can be varied. Then by disposing such a lens structure on opposite sides of a core layer of higher dielectric constant, the dielectric constant of the lens path decreasing away from the core, the dielectric wall structure of the invention is attained. The nose cap can be made of this structure.

We have found that the dielectric constant of the inner core layer can be effectively controlled by dispersing through it conductive pigments, such as: powders of aluminum, copper, graphite, and carbon black, all of which increase the average dielectric constant of the said layer. Without increasing the loss tangent of the core layer above 0.04, carbon black may be used up to 17 weight parts with 100 weight parts of resin composition, while aluminum and copper may be used up to 12 weight parts with 100 weight parts of resin composition, and up to 20 weight parts with 100 weight parts of a resin foam. When rocket radomes must operate at elevated temperatures during flight it is important to use wall materials whose dielectric constants do not vary substantially with temperature. Said conductive pigments are relatively insensitive to the temperature changes encountered.

The variable thickness core may be disposed for producing corrective structures having the properties of a convex lens as well as of a concave lens. Its corrective effect may be employed in company with electrical and mechanical corrections in scanner and radar systems for angular error in beam direction.

Examples of dielectric walls for radomes designed by the method of the present invention are as follows:

*Example I*

A conical radome having an apex angle of 25 degrees was placed over a conical scanning antenna radiating a cylindrical beam substantially 4 inches in diameter at a wave length of 3.2 centimeters. The wall of said radome was constructed so that the dielectric constant of the inner layer was 9.0, of the two outer layers 2.61, each outer layer thickness .214", the overall thickness of the wall 0.494", and the inner core layer thickness increased from 0.066 inch in the area of least phase front dissymmetry toward areas of greater dissymmetry at a rate of 0.0018 inch per inch, to correct a focussing effect shifting the crossover point one degree. Before assembly with the outer layers, the core was tested for concave lens behaviour. Areas of excess electrical thickness were ground off while deficiencies in electrical thickness were corrected by cementing on thin patches of material.

The outer layers were made of Butyl rubber compound of the following formula:

| | Weight parts |
|---|---|
| Butyl rubber | 100.0 |
| Stearic acid | 3.0 |
| Zinc oxide | 5.0 |
| Rutile titanium dioxide (Du Pont R-300) | 16.8 |
| Sulfur | 2.0 |
| Mercaptobenzothiazole | 0.5 |
| Tetramethyl thiuram disulfide | 1.0 |
| Santoflex B anti-oxidant (acetone, para-aminodiphenyl reaction product) | 3.0 |
| Total | 131.3 |

The inner layer was made of a polyester resin, fiber glass cloth laminate of the following formula:

| | Weight parts |
|---|---|
| Mixture of two solutions of polyester resin in styrene monomer (known as American Cyanamid Laminac 4201 and Laminac 4128) in 2:1 ratio | 1.124 |
| Benzoyl peroxide | 0.011 |
| Owens-Corning Fiberglas Fabric, ECC-162 | 1.592 |
| Rutile titanium dioxide (Du Pont R-300) | 1.084 |
| Total | 3.811 |

The inner layer was molded between male and female molds at 200 pounds per square inch pressure at 140° C. for 20 minutes. On removal from the mold the plastic surfaces were roughened and coated with low molecular weight polyisobutylene in preparation for adhesion of the outer layers. The Butyl rubber outer layers were then calendered to sheet form, and laid in the mold with the cured and coated inner layer between them. The entire assembly was then further cured under 200 pounds per square inch pressure at 140° C. for 20 minutes.

On electrical test the dielectric wall was found not to exceed 5% in power reflection at any point at any angle of incidence from 0°-80°, and no beam shift greater than 3 mils occurred.

*Example II*

An ogival shaped radome was constructed. Its dielectric wall had the same electrical constants and physical thicknesses as in Example I. However, for the outer layer of Butyl rubber compound which is to be the inner surface of the radome was substituted an equal thickness of rigid polymethyl methacrylate, and for the outer layer which is to be the outer surface of the radome was substituted an equal thickness of plasticized polyvinyl formal (Shawinigan Formvar, Type E). Both outer layers were injection molded against the resin laminated Fiberglas inner layer. On electrical test the performance was substantially identical with test results of Example I. On mechanical test the wall was found to have great flexural strength and rigidity.

*Example III*

Both outer layers were constructed of rigid polymethyl methacrylate of the same electrical and physical characteristics of Example II. The inner layer comprised a compound of 65 volume parts of plasticized polyvinyl formal loaded with 35 volume parts of rutile titanium dioxide. The layers were injection molded and then cemented together. The inner layer's electrical properties and thickness specification were substantially identical with the case of Example II. On electrical test the performance was substantially identical with the test results of Example II. The boresight accuracy was within 2 mils.

*Example IV*

A small conical rocket nose radome was constructed. It comprised three layers. The outermost was transfer molded of Du Pont Nylon No. 610, having a specific gravity of nearly 1.14 grams per cubic centimeter, a dielectric constant at 3.2 centimeters wave length of nearly 2.84 and a loss tangent of 0.0117. The design thickness for this layer was .204 inch. The middle or core layer adjacent was bag molded at 5 pounds per square inch pressure from Owens-Corning ECC 181-114 Fiberglas (100 weight parts) impregnated with a mixture of H. H. Robertson Co. heat resistant polyester-styrene resin, Stypol 16B, (157 weight parts) and Aluminum Corporation of America extra fine aluminum powder, Alcoa No. 422 (1818 weight parts). The properties of the core layer were as follows: specific gravity 1.5 grams per cubic centimeter, dielectric constant at 3.2 centimeters wavelength 10.63, loss tangent .0277, least thickness .052 inch increasing toward areas of dissymmetry at a rate of 0.0016 inch per inch. The third layer, representing the innermost surface of the radome was identical in composition and thickness with the outermost layer. The average specific gravity of the whole was 1.172 and the total thickness 0.460 inch. On electromagnetic wave transmission and reflection test it was found that about six percent in power was absorbed in one direction and that even with shifts in core thickness as great as .007 inch the reflected power did not exceed ten percent at 80 degrees incidence. For the most part, the reflection was less than 5 percent in power from zero to 85 degrees of incidence and the transmission better than 89 percent. The boresight accuracy was within 3 mils.

*Example V*

A large radome serving as an aircraft nose was molded of a four layer construction in which the outermost layer and the next adjacent layer had the same dielectric constant. The relative thickness of these two layers with respect to each other was unimportant electrically. The outermost layer was designed for resistance to erosion during flight and consisted of a rubber composition of pale crepe (100 weight parts), stearic acid (1 weight part), anti-oxidant (2-weight parts), (Monsanto Santoflex B, reaction product of acetone and paraamino-diphenyl), zinc oxide (5 weight parts), sulfur 3.3 weight parts, Monsanto Thiofide rubber accelerator benzothiazyl disulfide (0.5 weight part) and dry magnesium oxide (40 weight parts). The specific gravity was 1.22 grams per cubic centimeter, the dielectric constant at 3.2 centimeters 2.84, and the loss tangent .0094. Its thickness was 0.025". The next adjacent layer was bag molded at about 5 pounds per square inch pressure from Owens-Corning Fiberglas T39 mat (100 weight parts) impregnated with a polyester-styrene resin known as Stypol 16B and manufactured by the H. H. Robertson Co. (232 weight parts). The resin contained 2.32 parts of lauryl peroxide as a catalyst. The specific gravity of this layer was controlled so as to be 1.20, the dielectric constant at 3.2 centimeters wavelength 2.84, the loss tangent .0141, and the thickness .179 inch. The next layer, serving as the high dielectric constant core was bag molded at about 5 pounds per square inch pressure from Owens-Corning Fiberglas ECC-114 fabric (100 weight parts) impregnated with a mixture of Stypol 16B resin (157 weight parts) and Aluminum Company of America extra fine aluminum powder, Alcoa No. 422 (1818 weight parts). The specific gravity was 1.5 grams per cubic centimeter, the dielectric constant at 3.2 centimeters 10.63, the loss tangent 0.0277, and the thickness .052 inch. The next layer was of molded mat, having the same composition and properties as the other mat layer, but having a thickness of .204 inch. The total thickness of the radome wall was .460 inch, the power absorption about six percent, and the one-way reflection about five percent from zero to 80 degrees of incidence.

*Example VI*

The mechanical sandwich construction utilizes thin stressed skins of high tensile strength separated by a cellular core of lower density and strength, giving great weight economy and a high strength to weight ratio. A radome was designed in which this construction was used and in which the core possessed a higher dielectric constant than the surface layers. The six layers which was used will be described, proceeding from the outermost layer through the core layers to the opposite outer layer. The first three layers possessed the same dielectric constant. The outermost was an erosion resistant synthetic rubber compound consisting of GRS-10 butadiene-styrene copolymer (100 weight parts), Monsanto anti-oxidant Santoflex B, a reaction product of acetone and para-amino-diphenyl (two weight parts), zinc oxide (5 parts), sulfur (0.25 part), magnesium oxide (61 parts), and Monsanto Thiofide rubber accelerator, benzothiazyl sulfide, (0.5 part). The specific gravity of the compound was 1.39 grams per cubic centimeter, the dielectric constant 3.13, the loss tangent 0.008, and the thickness 0.020 inch. The next adjacent layer comprised 100 weight parts of a parallel fiber warp of fibers of a glass having a dielectric constant of 3.88, bonded with 255 weight parts of a polyester-styrene resin, Stypol 16B, manufactured by the H. H. Robertson Co., and 2.6 weight parts of a catalyst, benzoyl peroxide. The molded product had a specific gravity of 1.25, a dielectric constant of 3.13, and a thickness of 0.040 inch. This was one of the two stressed skins. The third layer was of a cellular core material, a resin foam comprising 100 weight parts of a heat resistant polyester-styrene resin, Stypol 102E, manufactured by the H. H. Robertson Co., 1.0 weight part of benzoyl peroxide, 17 weight parts of a glass fiber mat known as T39, manufactured by the Owens-Corning Fiberglas Corp., 20 parts of Alcoa No. 422 extra fine aluminum powder manufactured by the Aluminum Co. of America, and 5 parts of a dispersion of equal parts of sodium bicarbonate in a liquid aliphatic acid, known as Unicel S, and manufactured by the Du Pont Co. This was blown and cured at a density of 0.38 gram per cubic centimeter to yield a dielectric constant of 3.13, a loss tangent of 0.0369, and a thickness of 0.125 inch. The fourth and adjacent layer possessed a dielectric constant of 12.7 and comprised a glass fiber fabric known as Owens-Corning ECC 181-114, 100 weight parts, impregnated and bonded with the Stypol 16B polyester-styrene resin 65 parts, benzoyl peroxide catalyst 0.65 part, molded at low pressure and having a thickness of 0.042 inch. The fifth and next adjacent layer was of the same cellular core material as the third layer but having a thickness of 0.145 inch. The sixth layer was of the same stressed skin composition and thickness as the second layer. The total thickness was 0.412 inch. The one-way absorbed power was about seven percent, and the reflected power was less than 5 percent from zero to 85 degrees of incidence.

*Example VII*

A guided missile radome nose was designed for use at 3.2 centimeters wave length with a conical scanning antenna. A very heat resistant three layer sandwich was designed. The core layer increased in thickness from the apex of the radome toward the base end at a rate of 0.0027 inch per inch. The material of which said core was made was a porcelain having a dielectric constant of 5.51 and a loss tangent of 0.0155 as made by Knox by the wet process. Its least thickness was 0.100 inch. The outer layers were Du Pont Teflon polytetrafluuoroethylene, having a dielectric constant of 2.08, a loss tangent of 0.00037 and a thickness of 0.249 inch. The boresight accuracy was excellent, being within 1 mil, and the transmission very good, better than 90 percent.

*Example VIII*

A guided missile radome nose was constructed for use at 1.25 centimeters wave length for use with a conical scanning antenna. The apex of the ogive was blunt and of spherical shape having an inside radius of one inch, but the outside was brought to a point for aerodynamic improvement by attaching a metal plate lens in the form of a conical nose cap. The ogive was of standard NACA shape, 140 inches long and 52 inches in diameter at the base. As the direction of polarization of the beam rotated, the lens comprised a honeycomb of sheet metal parallel to the axis of the cone and to the axis of the ogive, filled with polytetrafluorcethylene. The spacing of the walls of the honeycomb being adjusted so that the wavelength of the electromagnetic waves being transmitted between them was equal to the free space wavelength, said conical nose cap had an effective dielectric constant of 1.0, whereby the transmission properties of said ogive were not substantially altered by the addition of said nose cap, but the aerodynamic streamlining was greatly improved. The core layer was of Corning Vycor glass containing 96 percent of silica and increasing in thickness away from the apex at a rate of .002 inch per inch, providing for a correcting phase retardation of 7.5 degrees, when the cross-over axis of the antenna pointed 7 degrees away from the longitudinal axis of the radome. The least thickness of said core layer was 0.058 inch, its dielectric constant was 3.72 and its loss tangent was 0.00056. The outer layers were constructed of mahogany wood having a dielectric constant of 1.75, a loss tangent of 0.021 and a thickness of 0.114 inch. The least over-all thickness of the wall was 0.286 inch. The boresight accuracy was within 2 mils.

*Example IX*

A guided missile nose was designed for use at 3.2 centimeters wavelength with conical scanning. A three layer sandwich was selected. The core layer was made to increase in thickness from the apex of the nose toward the base end at the rate of 0.00158 inch per inch in order to correct for a focusing effect which displaced the beam one degree toward the longitudinal centerline of the nose when the bore-sight axis of the antenna pointed 8 degrees away from the centerline. The outermost surface layer was made of a solid dispersion of Union Carbide and Carbon's polyvinyl chloride-acetate resin VYNV-3 (100 weight parts) in Plaskon's alkyd resin 911 (100 weight parts), having a dielectric constant of 2.93, a loss tangent 0.016, and a thickness of 0.196 inch. The core layer was made of Mycalex K-10, a ceramic of mica, glass, and titanium dioxide, having a dielectric constant of 11.3, a loss tangent of 0.004, and a least thickness of 0.050 inch. The other outer layer was made of General Aniline and Film's resin, Polectron poly-N-vinyl carbazole, having a dielectric constant of 2.93, a loss tangent of 0.00093, and a thickness of 0.196 inch. The least total wall thickness was 0.422 inch. The boresight accuracy was within 2 mils, the transmission better than 90 percent, and the heat resistance was very good.

As in the foregoing examples, non-focusing, de-focusing, and focusing structures embodying the invention comprise dielectric configurations of ceramics, dispersions of conductive particles, foams, glasses, laminates, lenses, plastics, plastisols, rubbers, and woods. Electrical layers of a given dielectric constant can be subdivided into layers of different chemical composition.

Many modifications and variations of the structures herein described will be apparent to those skilled in the art. Accordingly the invention is not to be limited by the details herein set forth but only by the spirit and scope of the appended claims.

This application is a substitute for the application of Edward B. McMillan and Raymond M. Redheffer, Serial No. 285,944, filed May 3, 1952, now abandoned.

Having thus described our invention, what we claim and desire to secure by Letters Patent is:

1. A dielectric wall comprising a central core dielectric layer and at least one pair of outer dielectric layers with the members of each pair on opposite sides of said core layer, the dielectric constants of said outer dielectric layers being less than that of said core layer, and said core layer having variations in electrical thickness whereby the shape of the phase front may be controlled.

2. A dielectric wall comprising a central core dielectric layer and at least one pair of outer dielectric layers with the members of each pair on opposite sides of said core layer, the dielectric constants of said outer dielectric layers being less than that of said core layer, being chosen to give no reflection greater than 10% independent of the thickness of said core layer, said core layer having the properties of a phase retarder for the passage of radiation, and said core layer having variations in electrical thickness whereby the shape of the phase front may be controlled.

3. A wall for transmission of electromagnetic radiation, comprising an inner core dielectric layer and outer dielectric layers disposed on each side of said core layer, each outer layer having a dielectric constant lower than that of the layer next adjacent toward said core, the thickness $d_K$ of each outer layer K being given by the equation:

$$d_K = \frac{\lambda}{4\sqrt{\epsilon_K - p}}$$

where $\lambda$ is the wavelength of said electromagnetic waves $\epsilon_K$ is the dielectric constant of said layer $\frac{d_K \sqrt{\epsilon_K - p}}{\lambda}$ is the electrical thickness of said layer $P = \sin^2 \theta$ where $\theta$ is the angle of incidence of said electromagnetic waves at the face of said layer furthermost from said core, said core layer having the properties of a phase retarder for the phase front of said radiation and having variations in electrical thickness whereby the shape of the phase front may be controlled.

4. The dielectric wall of claim 3 for transmission of electromagnetic wave radiation in which the dielectric constants of the outer layers on each side of the core increase with each layer toward the core and in which the dielectric constants of all of the layers and the thickness of each of the outer layers are determined by the equations:

$$\alpha = \cos \theta_2 \sqrt{\beta - p + p}$$

where $p = \sin^2 \theta_2$ $$d = \frac{(2n+1)\lambda}{4\sqrt{\alpha - p}}$$

where $n = 0, 1, 2, \ldots$ where $\alpha$ is the dielectric constant of an outer layer $\beta$ is the dielectric constant of the core $d$ is the outer layer thickness $\lambda$ is the wavelength of the radiation and $\theta_2$ is the design angle of incidence found graphically by intersecting the line, denoted by the equation:

$$\frac{2\gamma}{1+\gamma^2} = R$$

where $\gamma$ is the half-sandwich amplitude reflection and R is the whole sandwich amplitude reflection, with the curve of $\gamma$ versus $\theta_2$ plotted from the equations:

$$\gamma = \left[\frac{A-B}{A+B}\right]^{1/2}$$

where $A = (\alpha - \beta)(\alpha + 1) - (\alpha - \beta)(\alpha - 1) \cos \epsilon$ $B = 4\alpha\sqrt{\beta}$ $\epsilon = \frac{4\pi d \sqrt{\alpha}}{\lambda}$ $\alpha$ and $\beta$ having been computed for a range of design angles of incidence $\theta_2$; such that when a wave is transmitted through the wall at normal incidence or at any angle of incidence less than the final design angle there will be no whole sandwich power reflection $R^2$ in excess of ten percent, no matter how thick the central core layer is constructed.

5. The dielectric wall of claim 3, extending unsymmetrically in three dimensions with respect to a wave front of centimetric radiation, said outer layers having the properties of a convex lens due to the lack of symmetry such that the direction of radiation of said wave front is shifted, and said core having increasing electrical thickness away from the center of the area of the least dissymmetry to provide controlled phase retardation so as to have the properties of a correcting concave lens, whereby said radiation is restored to its original direction.

6. The dielectric wall of claim 5, wherein a portion of its area faces the direction of the high intensity portion of the impinging radiation at an angle in excess of 70 degrees, the electrical thickness of the core of said area being determined substantially by the equation:

$$\frac{x_c\sqrt{\beta-p}}{\lambda} = \left\{\frac{n}{2} - \frac{1}{2\pi}\tan^{-1}\left[\frac{2\sqrt{(\alpha-p)(\beta-p)}(\alpha-1)\sin\epsilon}{(\alpha+1-2p)(\beta-\alpha)+(\alpha-1)(\beta+\alpha-2p)\cos\epsilon}\right]\right\}$$

where:
$x_c$ = the optimum core thickness
$\beta$ = the core dielectric constant
$\lambda$ = the wavelength of the radiation
$n$ = zero or a whole number
$\alpha$ = the outer layer dielectric constant
$\epsilon = \frac{4\pi d\sqrt{\alpha-p}}{\lambda}$ $d$ = the outer layer thickness
$p = \sin^2 \theta_1$
$\theta_1$ = the actual angle of incidence of some portion of the radiation.

7. The dielectric wall of claim 5, comprising an ogive or cone shaped radome having a lens in the form of a streamlined nose cap.

8. The dielectric wall of claim 3, comprising at least one layer of dielectric material containing electrically conductive particles, whereby the dielectric constant of said layer is controlled.

References Cited in the file of this patent

UNITED STATES PATENTS

| | | |
|---|---|---|
| 2,509,903 | Brode et al. | May 30, 1950 |
| 2,659,884 | McMillan et al. | Nov. 17, 1953 |